United States Patent
Costa

(10) Patent No.: US 6,612,139 B1
(45) Date of Patent: Sep. 2, 2003

(54) SEAL WITH ANTI-THEFT DEVICE FOR ITEMS HAVING ROD-LIKE PORTIONS

(76) Inventor: Emilio Costa, Viale Trento 81, 36087 Valdagno (IT)

( * ) Notice: Subject to any disclaimer, the term of this patent is extended or adjusted under 35 U.S.C. 154(b) by 0 days.

(21) Appl. No.: 09/519,669

(22) Filed: Mar. 6, 2000

(51) Int. Cl.[7] ............................................. E05B 65/00
(52) U.S. Cl. .................... 70/57.1; 292/307 R; 24/704.1
(58) Field of Search .............................. 70/57.1–59, 14; 292/307 R; 24/704.1, 704.2

(56) References Cited

U.S. PATENT DOCUMENTS

| | | | | |
|---|---|---|---|---|
| 4,878,702 A | | 11/1989 | Madsen et al. | 292/307 |
| 4,991,413 A | * | 2/1991 | Arnaldo | 70/19 |
| 5,119,652 A | * | 6/1992 | Costa | 70/57.1 |
| 5,140,836 A | * | 8/1992 | Hogan et al. | 70/57.1 |
| 5,144,820 A | * | 9/1992 | Holmgren | 70/57.1 |
| 5,275,027 A | * | 1/1994 | Elkof | 70/14 |
| 5,437,172 A | * | 8/1995 | Lamy et al. | 70/57.1 |
| 5,680,681 A | * | 10/1997 | Fuss | 24/704.1 |
| 6,145,167 A | * | 11/2000 | Brentini | 24/3.1 |
| 6,276,033 B1 | * | 8/2001 | Johnson et al. | 24/704.1 |
| 6,279,358 B1 | * | 8/2001 | Costa | 70/57.1 |
| 6,311,531 B1 | * | 11/2001 | Sykes | 70/57.1 |
| 6,330,758 B1 | * | 12/2001 | Feibelman | 70/57.1 X |

FOREIGN PATENT DOCUMENTS

| | | |
|---|---|---|
| DE | A-35 22 252 | 1/1987 |
| EP | A-0 396 850 | 11/1990 |
| EP | A-0 456 158 | 11/1991 |
| EP | A-0 899 706 | 3/1999 |
| FR | A-2 631 801 | 12/1989 |
| FR | A-2 729 490 | 7/1996 |
| WO | A-96 23123 | 8/1996 |

* cited by examiner

*Primary Examiner*—Suzanne Dino Barrett
(74) *Attorney, Agent, or Firm*—Guido Modiano; Albert Josif; Daniel O'Byrne

(57) ABSTRACT

A seal with anti-theft device for items having rod-like portions, particularly for eyeglasses. The seal comprises a hollow body which contains an electronic signal-emitting component and forms a plane of arrangement for a rod-like portion. Two parallel and mutually opposite guides protrude from the body and each guide has at least one sawtooth engagement surface for the nonreversible sliding, in a direction which is perpendicular to the plane of arrangement, of a slider which has complementary sawtooth engagement surfaces. The rod-like portion is retained between the plane of arrangement and a parallel plane of arrangement formed by the slider.

12 Claims, 3 Drawing Sheets

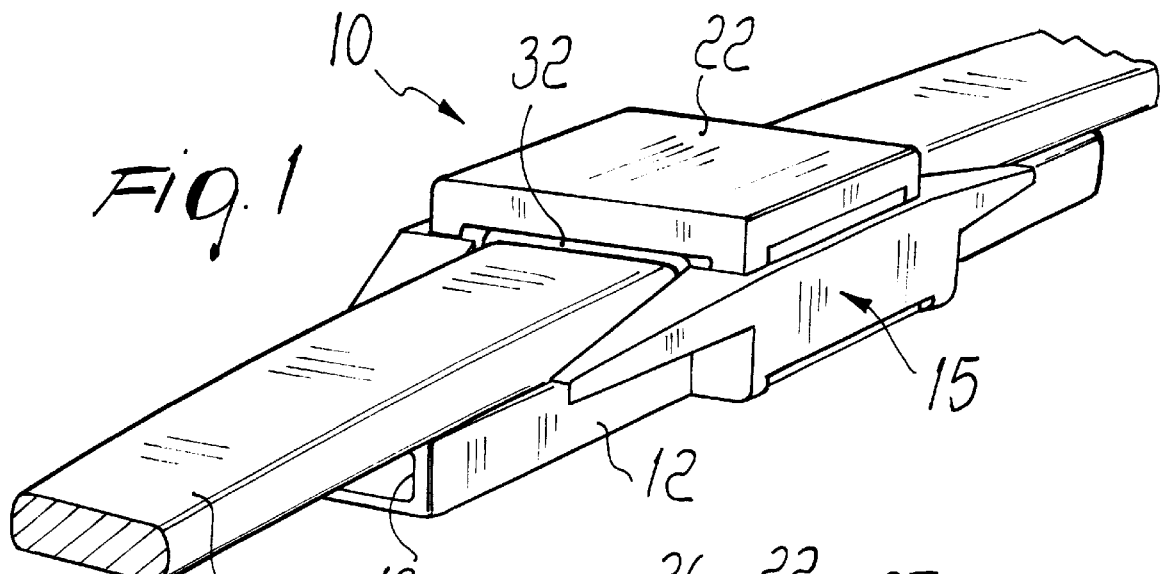
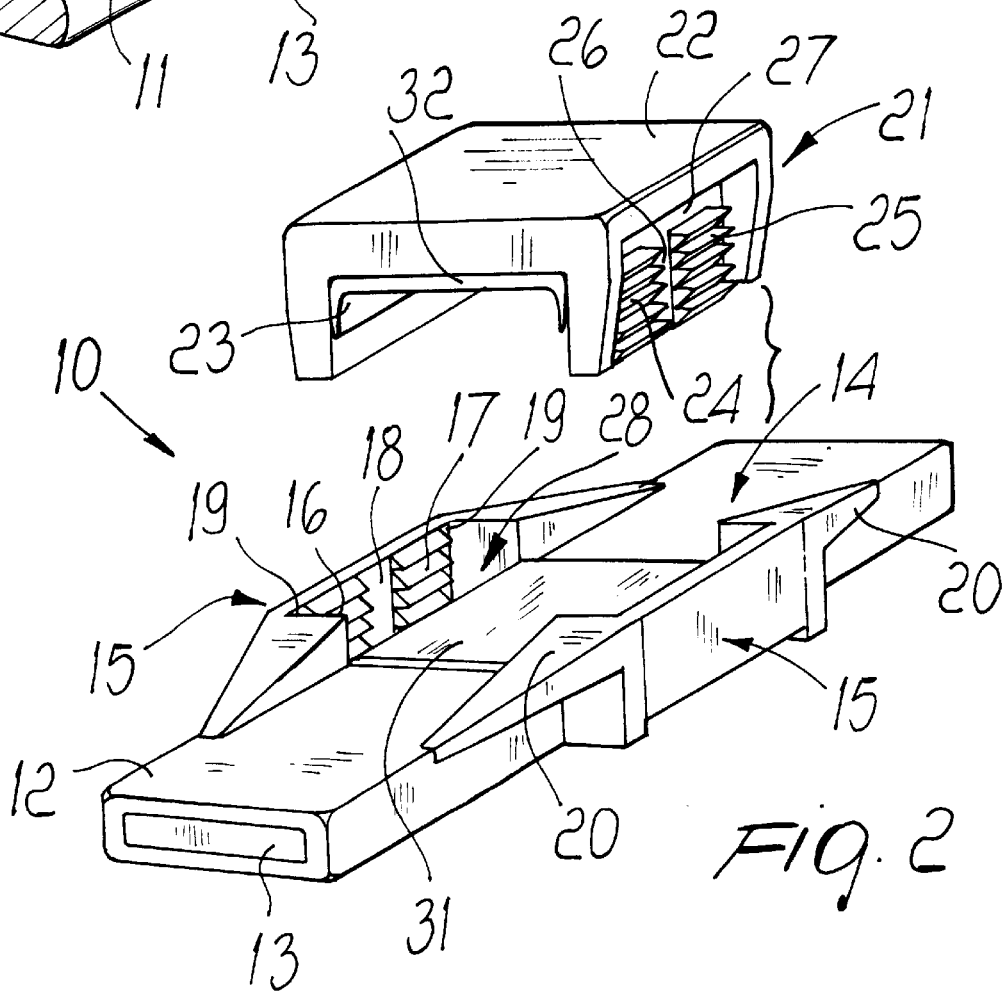

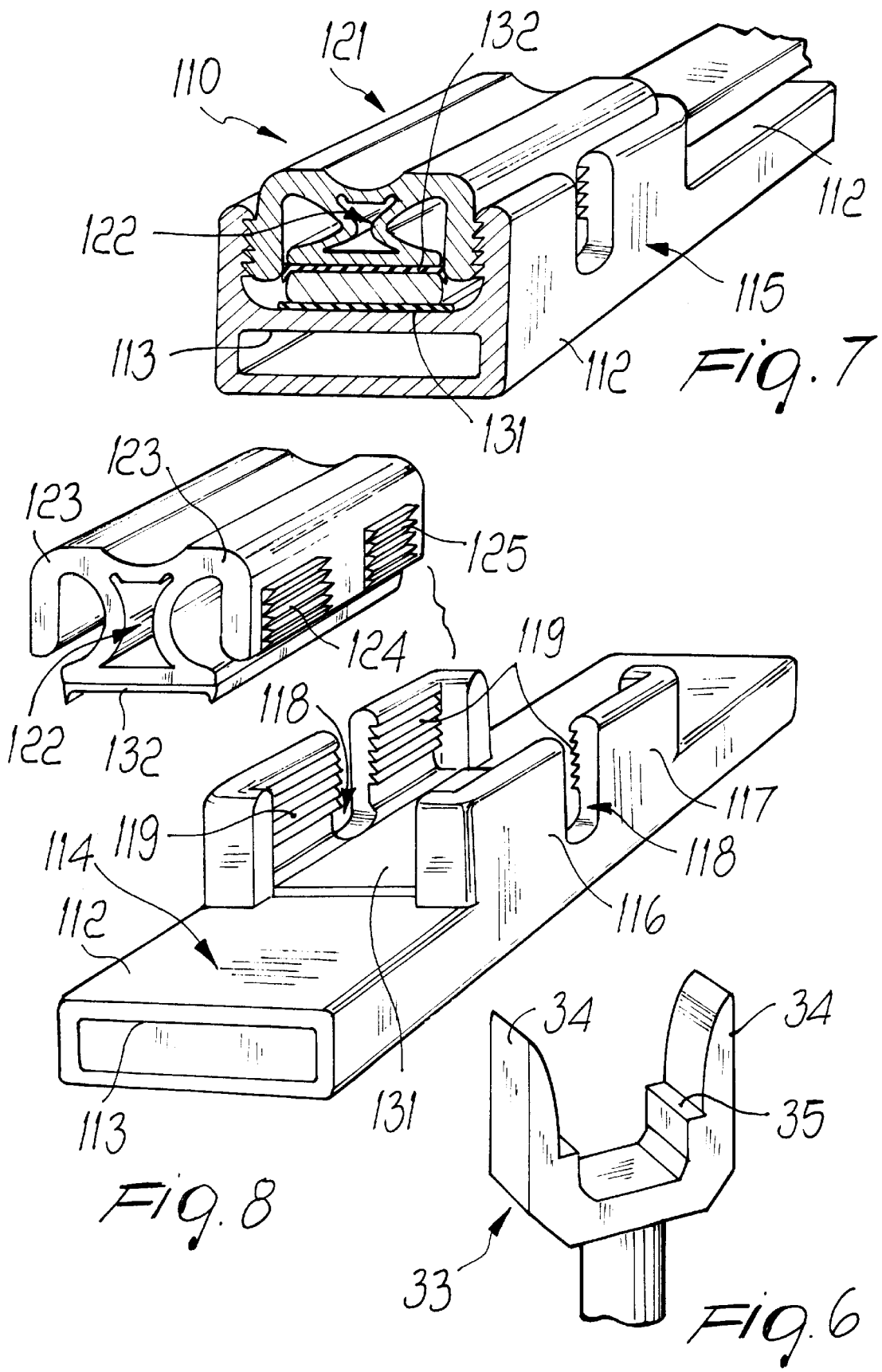

SEAL WITH ANTI-THEFT DEVICE FOR ITEMS HAVING ROD-LIKE PORTIONS

BACKGROUND OF THE INVENTION

The present invention relates to a seal with anti-theft device for items having rod-like portions.

Said seal is particularly adapted to be applied to the temples of eyeglasses.

It is in fact well-known that eyeglasses are currently commonly provided, in points of sale, with adapted seals on which a customization marking or, more simply, the trademark of the manufacturer is provided.

In recent times, in particular, in said seals an anti-theft device is usually integrated which is capable of activating electronic alarm circuits usually arranged proximate to the exits.

Said seals usually comprise a box-like body from which a tab protrudes is which is constituted by consecutive articulated elements and is shaped so that it can fold up so as to form, in combination with said body, a containment seat for the rod-like portion of the item to which the seal is to be applied.

An electronic signal-emitting component of the per se known type is inserted in the box-like body.

The seal is further provided with a slider which nonreversibly engages a guide which is rigidly coupled to the box-like body.

The slider has a mushroom-shaped head which enters and slides within a complementarily shaped seat formed in the tab, so as to lock said tab in the folded position.

In this manner, the rod-like portion is retained in the seat formed by the folding of the tab through the nonreversible locking of the slider.

In particular, the slider slides at right angles to the rod-like portion, on the plane, formed by the box-like body, on which said rod-like portion rests.

The retention of the temple is in fact provided by the head of the slider and by the edge of the tab and is accordingly provided on a plane which is parallel to the resting plane.

This type of seal, although ensuring many advantages, unfortunately also entails drawbacks.

First of all, the fact should be noted that the structure of the body of the seal allows a limited travel of the slider, to the point that said slider can reach the end of its travel without having conveniently locked the rod-like portion.

Accordingly, in this type of seal there is a limited range of rod-like portions that can be retained therein without mutual rotations occurring.

For example, many problems can arise in trying to apply the anti-theft seal to items with rod-like portions having a particularly narrow cross-section.

Additionally, unfortunately the bulk of the anti-theft seal applied for example to the temples of eyeglasses is responsible for many difficulties linked to the operations performed in order to arrange said eyeglasses on the displays located in points of sale.

The seals can in fact be applied to a temple without ensuring the locking thereof in the containment seat, and although they prevent extraction they can easily rotate with respect to said temple, assuming an inclined position and thus making it difficult to arrange the eyeglasses in the displays.

Moreover, currently commercially available seals also cannot be applied to items which have considerably large rod-like portions, because the containment seat that they form has a rather small cross-section with respect to the overall dimensions of the seal.

Additionally, the seals that are currently widely used can be reused only partially, since in order to disengage them from the portions to which they have been applied it is necessary to break the mushroom-shaped head of the slider; accordingly, a replacement for the slider must be available before being able to reuse the seal by applying it to a new rod-like portion.

SUMMARY OF THE INVENTION

The aim of the present invention is to provide a seal with anti-theft device for items having rod-like portions which solves the drawbacks mentioned above of conventional seals.

Within the scope of this aim, an object of the present invention is to provide a seal with anti-theft device which cannot be slid off the item to which it is applied and is more compact than conventional models.

Another object is to provide a seal with anti-theft device which can be also applied to rod-like portions having a small cross-section without the possibility of unwanted movements or rotations.

Another object is to provide a seal with anti-theft device which can be applied without problems even to rather large rod-like portions.

Another object of the present invention is to provide a seal which can be fully reused after the item to which it is applied has been sold.

Another object of the present invention is to provide a seal with anti-theft device with which the slider cannot be moved to the end of its travel without locking the rod-like portion for which it is designed.

Another object is to provide a seal with anti-theft device which is comparable in cost to conventional seals.

This aim, these objects and others which will become apparent hereinafter are achieved by a seal with anti-theft device for items having rod-like portions, characterized in that it comprises a hollow body which is suitable to contain an electronic signal-emitting component and forms a plane of arrangement for a rod-like portion, two parallel and mutually opposite guides protruding from said body, each guide having at least one sawtooth engagement surface for the nonreversible sliding, in a direction which is perpendicular to the plane of arrangement, of a slider which has complementary sawtooth engagement surfaces, said rod-like portion being retained between said plane of arrangement and a parallel plane of arrangement formed by said slider.

BRIEF DESCRIPTION OF THE DRAWINGS

Further characteristics and advantages of the present invention will become apparent from the description of two preferred embodiments thereof, illustrated only by way of non-limitative example in the accompanying drawings, wherein:

FIG. 1 is a perspective view of a first embodiment of a seal with anti-theft device according to the invention, in the operating configuration;

FIG. 2 is an exploded view of the seal with anti-theft device shown in FIG. 1;

FIG. 6 is a perspective view of an extractor tool used to disengage a seal with anti-theft device from a rod-like portion to which it has been applied;

FIG. 7 is a perspective view of a seal with anti-theft device in a second embodiment;

FIG. 8 is an exploded view of the seal with anti-theft device of FIG. 7.

DESCRIPTION OF THE PREFERRED EMBODIMENTS

Figure 3:
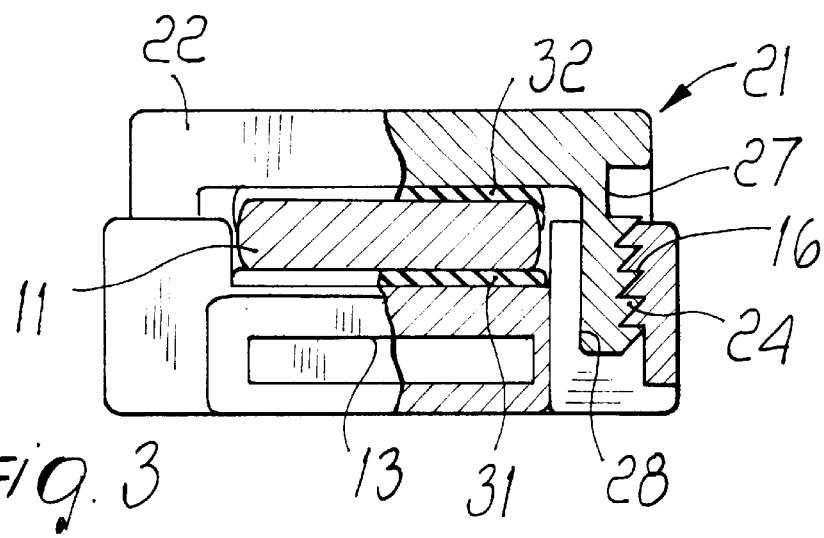
FIG. 3 is a partially sectional side view, taken along a transverse plane, of the seal of FIG. 1.
Figure 4:
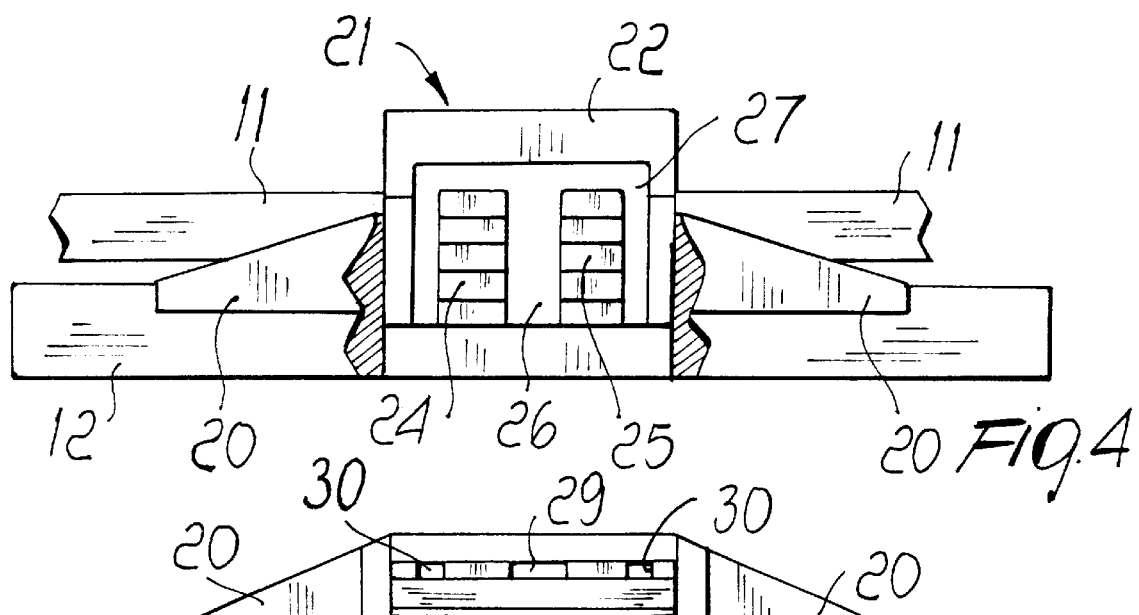
FIG. 4 is a partially sectional side view, taken along a longitudinal plane, of the seal of FIG. 1.
Figure 5:
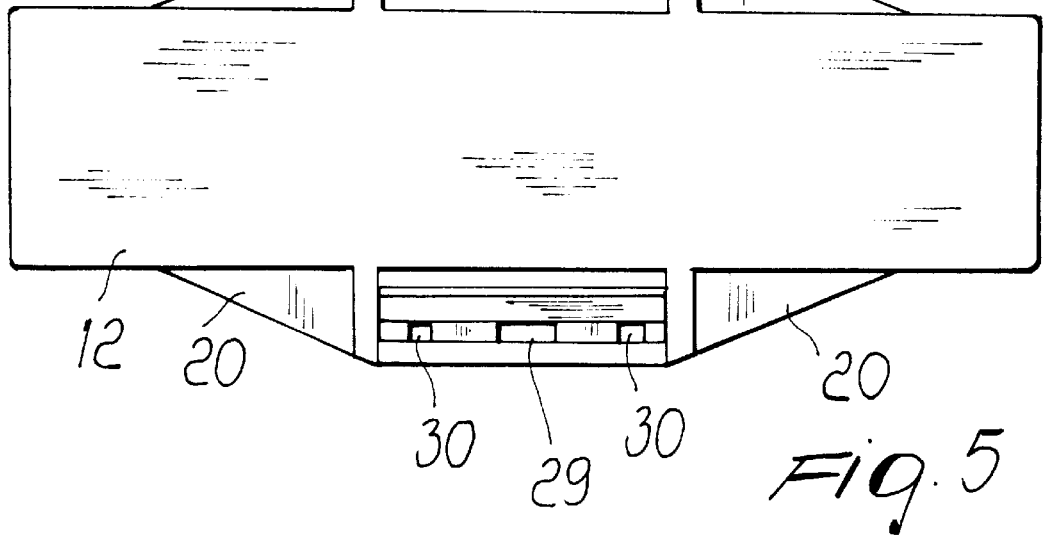
FIG. 5 is a bottom view of the anti-theft seal of FIG. 1.

With particular reference to FIGS. 1 to 6, a seal with anti-theft device for items having rod-like portions, according to the invention, in a first embodiment is generally designated by the reference numeral 10 and is preferably made of plastics.

In this case, the seal 10 is applied to a temple 11 of a pair of eyeglasses which are not shown in the above-cited figures for the sake of simplicity.

The seal 10 comprises a longitudinally elongated hollow body 12 on which, at one of the smaller faces, a slot 13 is provided through which an electronic signal-emitting component of the per se known type, not shown, is inserted and subsequently sealed.

Said body 12 forms, at a face 14, a plane of arrangement for the temple 11.

Two mutually facing guides 15 protrude from said face 14 at a central region.

Each guide 15 is monolithic with the body 12 and is substantially constituted by a wall which is perpendicular to the body 12 and on which, at the inward face, a first portion and a second portion with a sawtooth surface are formed, designated by the reference numerals 16 and 17 respectively.

Said first and second portions 16 and 17 are conveniently mutually separated by a flat intermediate region 18.

Each one of said first and second portions 16 and 17 is contiguous, at the outward side, to a narrow flat portion 19.

Blending portions 20, shaped conveniently so as to avoid sharp corners, protrude from the body 12 from the sides of each one of said guides 15.

The seal 10 is completed by a slider 21 which is also preferably made of plastics and substantially bridge-shaped; said slider has a flat portion 22, from whose ends mutually parallel and facing wings 23 protrude at right angles.

Said wings 23 can flex elastically.

On the outward face of each one of said wings 23 there are a first complementary sawtooth portion and a second complementary sawtooth portion, designated by the reference numerals 24 and 25 respectively and suitable to nonreversibly engage the corresponding first and second sawtooth portions 16 and 17 formed on the guides 15.

Said first and second sawtooth portions 24 and 25 are mutually separated by an intermediate flat region 26 which is equivalent, in terms of dimensions, to the corresponding intermediate flat region 18 formed on each guide 15.

Advantageously, said first and second sawtooth portions 24 and 25 are delimited externally by a half-frame 27 which is also flat.

Said slider 21 is suitable to slide, by means of the wings 23, along the guides 15 in a direction which is perpendicular to the plane of arrangement of the temple 11.

In particular, said sliding is nonreversible and is performed by said first and second sawtooth portions 24 and 25, which mesh and continuously move beyond the sawtooth protrusions of the first and second portions 16 and 17.

Conveniently, on the body 12, proximate to each guide 15, there is, starting from the face 14, a recess 28 which is shaped complementarily to the corresponding wing 23 of the slider 21.

A first through hole 29 is centrally provided from the bottom of each recess 28 and there are second holes 30, smaller than said first hole, at its sides.

Said first and second holes 29 and 30 form, in this embodiment, openings which have a rectangular cross-section and are exactly and correspondingly aligned with the intermediate flat region 18 and with the narrow flat portions 19 formed between said first and second sawtooth portions 16 and 17 on each guide 15.

Said seal 10 further has, in the region of the face 14 that lies between said guides 15, a first flat lip 31 which is preferably made of elastomer.

Correspondingly, on the lower face of the flat portion 22 of the slider 21, between the wings 23, there is provided a second lip 32 which is also flat and made of elastomer.

Said temple 11 is accordingly retained in the seat formed by the plane of arrangement of the face 14 of the body 12 and by the parallel plane of arrangement formed by the flat portion 22 of the slider 21 once it has nonreversibly coupled to the guides 15.

In particular, said first and second gaskets 31 and 32 ensure perfect retention of the temple 11.

In this case, therefore, said slider 21 is capable of effectively locking rod-like portions having very narrow cross-sections as well as very wide portions, without the possibility of unwanted relative movements or rotations or difficulties in locking.

Said seal 10 can also be reused by using a disengagement extractor tool, shown schematically in FIG. 6 and designated by the reference numeral 33.

Said extractor tool 33 is in fact provided with at least two tabs 34 with wedge-like tips, each of which has, at the part that lies furthest from the tips, an abutment region 35.

Said tabs 34 can be inserted in the openings formed, in this case, by said first holes 29 until the ends of the wings 23 abut against the abutment regions 35.

Once this is done, said tabs 34 act on the flat intermediate regions 26 of the wings 23, so as to produce their inward flexing and simultaneously produce disengagement from the guides 15.

Said first and second sawtooth portions 24 and 25 of the wings 23 in fact disengage from the corresponding first and second sawtooth portions 16 and 17 of the guides 15, thus allowing the disengagement of the slider 21 and accordingly allowing to open the seal 10.

In particular, it should be noted that differently from conventional seals, the retention of the rod-like portion is provided between the slider and the body, on a plane which is perpendicular to the plane of arrangement of said temple.

In this manner, the effectiveness of the retention is in fact ensured with rod-like portions having any cross-section, even a very small one.

It is important to stress that in other embodiments it is possible to use an extractor tool provided with a larger number of wedge-like tabs, so long as they are shaped complementarily to the first and second holes 29 and 30 formed in the body 12 of the seal 10.

It is also interesting to note that the presence of said blending portions 20 gives said seal 10 a tapering configuration which has no sharp corners.

In this manner, if said seal 10 is applied to the temple 11 of a pair of eyeglasses, said eyeglasses can be easily and comfortably be placed in a display.

With particular reference to FIGS. 7 and 8, a seal with anti-theft device in a second embodiment is generally designated by the reference numeral 110 and is preferably made of plastics.

The seal 110 comprises a longitudinally elongated hollow body 112 which is provided with a slot 113 inside which an electronic signal-emitting component, of the per se known type and not shown, is inserted.

Two mutually facing guides 115 protrude from the contact face 114 for the rod-like portion, now designated by the reference numeral 111, for which it is designed.

Each guide 115 is substantially constituted by a first wall and a second wall, designated by the reference numerals 116 and 117, which lie at right angles to the body 112 and are separated by an opening 118.

Portions 119 having a sawtooth surface are formed on the inward face of each one of said first and second walls 116 and 117.

The seal 110 is coupled to a slider 121, which is also made of plastics and is provided with a core 122 from which substantially L-shaped mutually parallel wings 123 cantilever out.

Said wings 123 can flex elastically.

A first complementary sawtooth portion and a second complementary sawtooth portion, designated by the reference numerals 124 and 125 respectively, are formed on the outward face of each one of said wings 123; said sawtooth portions are suitable to nonreversibly engage the corresponding sawtooth portions 119 of the first and second walls 116 and 117 of the guides 115.

Said first and second sawtooth portions 124 and 125 are mutually separated by a flat intermediate region 126 which is equivalent, in terms of dimensions, to the corresponding opening 118 of each guide 115.

Said slider 121 is suitable to slide, by means of the wings 123, along the guides 115 at right angles to the plane of arrangement of said rod-like portion 111.

Said seal 110 has, in the region of the face 114 that lies between said guides 115, a first flat lip 131 which is preferably made of elastomer.

A second lip 132 is correspondingly provided on the lower face of the core 122 of the slider 121 and is also flat and made of elastomer.

The rod-like portion 111 is accordingly retained in the seat formed by the plane of arrangement of the face 114 of the body 112 and by the parallel plane of arrangement formed by the lower face of the core 122 of the slider 121 once it has nonreversibly coupled to the guides 115.

In this case, the disengagement of the seal 110 from the rod-like portion 111 can be easily completed by using pincers, not shown in the above figures for the sake of simplicity, by means of which an inward flexing of the wings 123 is produced by acting at the openings 118.

Once this has been done, said first and second sawtooth portions 124 and 125 of the wings 123 disengage from the corresponding sawtooth portions 119 of the guides 115, thus allowing the disengagement of the slider 121 and accordingly the opening of the seal 110.

In practice it has been observed that the present invention fully achieves the aim and all the intended objects.

An important advantage has been achieved by the present invention in that a seal with anti-theft device has been provided which can also be applied to rod-like portions having any cross-section without the possibility of rotations, unwanted movements, or difficulties in locking.

Another advantage is ensured by the fact that a seal with anti-theft device has been provided which is more compact than conventional models although allowing use with considerably wide temples.

Another important advantage is further certainly constituted by the fact that a fully reusable seal has been provided.

Not least advantage of the present invention is that a seal with anti-theft device has been provided whose cost is fully comparable with the cost of conventional models.

The present invention is susceptible of numerous modifications and variations, all of which are within the scope of the same inventive concept. All the details may be replaced with other technically equivalent elements.

The materials used, so long as they are compatible with the contingent use, as well as the dimensions, may be any according to requirements.

What is claimed is:

1. A seal with anti-theft device for items having rod-like portions, comprising a hollow body which contains an electronic signal-emitting component of said anti-theft device for activating an electronic alarm circuit and which forms a plane of arrangement for a rod-like portion, two parallel and mutually opposite guides protruding from said body, each guide having at least one sawtooth engagement surface for the nonreversible sliding, in a direction which is perpendicular to the plane of arrangement, of a slider which has complementary sawtooth engagement surfaces, said slider comprising wings which cantilever out and on which said complementary sawtooth surfaces are provided, said wings being elastically flexible, said rod-like portion being retained between said plane of arrangement and a parallel plane of arrangement formed by said slider when said wings of said slider engage said guides whereby at least one opening is formed between said wings and said guides for receiving an extractor tool acting on said elastically flexible wings to elastically push said elastically flexible wings for disengagement of said at least one sawtooth engagement surface of said wings from said complementary sawtooth engagement surfaces of said guides for removal of said wings from said guides and subsequently for selected removal and arrangement of said rod-like portion.

2. The seal according to claim 1, wherein said complementary sawtooth surfaces of said wings are provided at outward faces of said wings.

3. The seal according to claim 2, wherein each one of said guides comprises a wall which protrudes at right angles from said body, said at least one sawtooth surface being formed on said wall at an inward face of said wall.

4. The seal according to claim 3, wherein at least one flat region is formed on each one of the outward faces of said wings of the slider.

5. The seal according to claim 4, wherein on the inward face of each one of said guides there is provided at least one flat region which faces the corresponding flat region formed on the wing of the slider.

6. The seal according to claim 5, wherein in said body, proximate to each one of said guides, there is provided a recess, each one of said recesses being shaped complementarily to one of said wings of the slider.

7. The seal according to claim 6, wherein starting from a bottom of each one of said recesses, in the hollow body at least one through hole is provided, said hole forming said opening which is aligned with the flat region formed on the guide and is suitable to allow the insertion of a wedge-shaped tab of an extractor tool.

8. The seal according to claim 4, wherein said opening is formed on each guide and is aligned with the flat region formed on the corresponding wing of the slider.

9. The seal according to claim 1, further comprising a lip which is arranged on said hollow body in the region between said two parallel and mutually opposite guides.

10. The seal according to claim 2, further comprising a lip which is arranged on a lower face of said slider which is interposed between said wings.

11. The seal according to claim 1, wherein said hollow body has a slot in which said electronic signal-emitting component is inserted.

12. The seal according to claim 3, comprising blending portions which protrude from said hollow body to the sides of each one of said guides, said blending portions giving said seal a tapering configuration which has no sharp corners.

* * * * *